United States Patent [19]

Sato et al.

[11] Patent Number: 4,987,012
[45] Date of Patent: Jan. 22, 1991

[54] PROCESS FOR PREPARING MONO-DISPERSED PARTICLES

[75] Inventors: Goro Sato; Michio Komatsu; Hiroyasu Nishida; Yoshichika Tanaka; Tsuguo Koyanagi, all of Fukuoka; Kei-ichi Mihara, Chiba, all of Japan

[73] Assignee: Catalysts & Chemicals Industries Co., Ltd., Tokyo, Japan

[21] Appl. No.: 511,197

[22] Filed: Apr. 18, 1990

Related U.S. Application Data

[60] Division of Ser. No. 206,863, Jun. 13, 1988, Pat. No. 4,925,704, which is a continuation-in-part of Ser. No. 13,422, Feb. 11, 1987, abandoned.

[30] Foreign Application Priority Data

Feb. 12, 1986 [JP] Japan .............................. 61-28360
Aug. 20, 1986 [JP] Japan .............................. 61-194936
Oct. 2, 1986 [JP] Japan .............................. 61-235340
Oct. 9, 1986 [JP] Japan .............................. 61-240431

[51] Int. Cl.$^5$ ............................................. B05D 7/00
[52] U.S. Cl. ................................... 427/221; 423/592; 428/1
[58] Field of Search ..................... 423/592; 427/221; 428/1

[56] References Cited

U.S. PATENT DOCUMENTS

4,678,657 7/1987 Sood et al. ..................... 423/600
4,724,134 2/1988 Sood ............................. 423/592

Primary Examiner—Michael Lusignan
Attorney, Agent, or Firm—Wenderoth, Lind & Ponack

[57] ABSTRACT

In a process for preparing spherical particles of hydroxide having a particle diameter of from 0.1 to 10 μm by adding a corresponding metal alkoxide to a dispersion of water-alcohol system having dispersed therein a metal oxide or hydroxide as a seed, under alkaline conditions and allowing a decomposition product from said metal alkoxide to attach onto said seed to effect particle growth of the seed, the improvement which comprises maintaining said dispersion at a substantially constant pH within the range between 10 and 13 during the addition of the metal alkoxide to said dispersion and the subsequent particle growth of the seed, thereby to prepare mono-dispersed particles substantially free from particle aggregation having a sharp particle size distribution of a standard deviation of not greater than 0.5. The white particles so prepared may be, after separation, heat treated to provide black particles. The white or black particles may be coated with a synthetic resin in the surface. The products are useful particularly as spacers for liquid crystal display devices.

10 Claims, 2 Drawing Sheets

PROCESS FOR PREPARING MONO-DISPERSED PARTICLES

RELATED APPLICATION

This application is a divisional of application Ser. No. 07/206,863, filed on Jun. 13, 1988, now U.S. Pat. No. 4,925,704, patented May 15, 1990, which in turn is a CIP application of Ser. No. 07/013,422, filed Feb. 11, 1987, now abandoned.

FIELD OF THE INVENTION

This invention relates to processes for preparing mono-dispersed particles of metal oxides or metal hydroxides having an average particle diameter of about 0.1-10 μm and a sharp particle size distribution of a standard deviation of not greater than 0.5. saId particles being particularly useful as spacer particles for display devices.

BACKGROUND OF THE INVENTION

It is expected that particles of metal oxides or metal hydroxides which are sharp in particle size distribution are favorably usable for a variety of applications, for example, as raw materials for ceramics, fillers for resins, spacers for liquid crystal display devices and the like. Expected is the use as insulators for liquid crystal spacers of particles of metal oxides or metal hydroxides, particularly those which have a relatively large particle diameter such as greater than 0.1 μm and which are sharp in particle size distribution thereof.

That is, liquid crystal display devices are widely used as display devices for watch, computer or wall-hanging television. This liquid crystal display device is a display device in which liquid crystal is used, the molecular arrangement of which changes merely by application of a slight voltage resulting in variations in the direction of deflection. Such a display device usually has a structure comprising two plate electrodes having interposed a liquid crystal layer therebetween.

In the liquid crystal display devices of the kind, it is desired that a thickness of the liquid crystal layer is thin and uniform as far as possible. If the thickness of the liquid crystal layer is not uniform, partial unevenness is brought about in the strength of electric field to be applied to the liquid crystal layer, with the result that a contrast ratio of the image varies depending on the local area of the liquid crystal layer, resulting irregularities of the image. Furthermore, a rate of response to an input signal of liquid crystal will vary according to the thickness of the liquid crystal layer and to the strength of electric field. If, therefore, the thickness of the liquid crystal layer is not uniform, a difference will develop in the rate of response, and no sharp images come to be obtained.

For the reasons mentioned above, it has been a usual practice in the manufacture of liquid crystal display devices that a spacer consisting of a thin insulator is interposed between two plate electrodes and liquid crystal is filled therebetween to form a thin and uniform liquid crystal layer between the two plate electrodes.

As spacers adopted in the liquid crystal display devices mentioned above, there have been used spherical aluminum oxide for abrasives which has been classified into particles of 2-10 μm, glass fiber of 2-10μm in diameter which has been cut into pieces of 50-100 μm in length, or a synthetic resin such as benzoguanamine which has been formed into spheres of 2-10 μm.

In the liquid crystal display devices employing such conventionally known spacers, no particularly serious problem is brought about when the devices are of small size, but such problems as mentioned below are encountered in the devices when they are of large size.

(a) It is necessary to vary delicately a thickness of liquid crystal layer according to the kind of liquid crystal used, but it is practically impossible to control the shape of spacer capable of coping with this delicate variation in thickness of the liquid crystal layer.

(b) It is not possible to provide a liquid crystal layer having a uniform thickness because the spacer particles are broad in particle size distribution, with the result that irregularities occur in the displayed images or abnormal color tone is brought about in certain cases.

(c) Where a strong dielectric liquid crystal is used, it is necessary that the liquid crystal layer be made to have a thickness of about 1-2 μm. However, no such spacer capable of controlling a thickness of liquid crystal layer so as to have the thickness mentioned above.

(d) There are some cases wherein spacer particles in the liquid crystal layer aggregate and come to be visible to the naked eye in the displayed images or spacers having a long axis of 10-50 μm come to be visible themselves to the naked eye in the displayed images.

(e) When spacer particles used are not spherical, the spacer comprising the same sometimes damages transparent electrodes, whereby the resulting liquid crystal device is found to be a defective unit.

(f) Where a resin is used as a spacer, it apts to undergo change in shape when heat or pressure is applied thereto, whereby no liquid crystal layer having a uniform thickness can be obtained.

Under these circumstances, desired is the advent of such spacer particles consisting of metal oxides or metal hydroxides for use in liquid crystal display devices as capable of solving the above-mentioned problems.

If black spacer particles consisting of metal oxides for use in liquid crystal devices are available, the display devices excellent particularly in point of contrast of the displayed images are obtained, and hence desired ardentlY is the advent of such black spacer particles mentioned above.

Furthermore, spacer particles consisting of metal oxides or metal hydroxides for use in liquid crystal display devices, which have been coated on the surface thereof with synthetic resins, do not move in the display devices, and hence the advent of such resin coated spacer particles is also desired.

In preparing particles of metal oxides or metal hydroxides mentioned above, for example, silica particles, there has heretofore been known a process Wherein silicic acid obtained from water-glass is allowed to grow to obtain silica sol having dispersed particles of silica having an average particle diameter of 0.05-0.1 μm in a liquid. In the case of the thus obtained silica sol, however, miscells are formed if the particles in the sol have a particle diameter of less than 0.05 μm, and if the particles have a particle diameter exceeding 0.05 μm, particle size distribution thereof becomes sharp but the particles mono-dispersed in the sol are few in number. Moreover, there were involved in this process such problems that it is difficult to obtain particles having a particle diameter of greater than 0.1 μm and it takes a long period of time such as from several days to scores of days while keeping the reaction system at elevated temperatures if the particles having a particle diameter of greater than 0.1 μm are intended to obtain, and, at the same time, new seeds are apt to form in the reaction system during the particle growth state and consequently a particle size distribution of the resulting particles becomes broad. Accordingly, it is not possible, according to this process, to obtain on a commercial scale the monodispersed particles having a particle diameter of greater than 0.1 μm and a sharp particle size distribution.

There has also been known a process for obtaining metal oxide or metal hydroxide particles having a particle diameter of about 0.05-2 μm by hydrolyzing metal alkoxides in the presence of alkali catalysts in a water-alcohol system solvent. This process has such advantages that there is no need for keeping the reaction system at elevated temperatures and particles having a particle diameter of about 1-2 μm and a relatively sharp particle size distribution are obtained bY the reaction for several hour to scores of hours. In the process, however, there were involved such problems that when particles to be obtained by this process are, for example, those of silica, titania or zirconia, the particles having such properties as mentioned above are obtained only when the particle concentration in the reaction system is less than 0.5% by weight in terms of an oxide concentration, and consequently the productivity decreases, large amounts of organic solvent such as alcohol are needed and the cost of production increases. In this process. Moreover, when the particles aimed at are those of silica, the particle diameter of the particles obtained is 0.2-0.3 μm at the most. If the particles of having a particle diameter of greater than 0.5 μum are aimed at in this process, the starting metal alkoxide used in the process must be those having a slow rate of hydrolysis, i.e. alkoxides containing long ester groups having about 5-7 carbon atoms. However, such specific alkoxides are expensive, and the use of these alkoxides involves such problems that because of a slow rate of hydrolysis, a long period of time is required for carrying out the reaction, the alkoxides are liable to undergo such influences as the composition of the reaction system, reaction temperature, stirring method, stirring speed, etc., and mono-dispersed metal oxide or metal hydroxide particles of stable quality cannot be obtained.

OBJECT OF THE INVENTION

The present invention is intended to solve such problems associated with the prior art as mentioned hereinbefore, and an object of the invention is to provide a process for preparing mono-dispersed particles substantially free from particle aggregation, through which metal oxide or metal hydroxide particles which are large in particle diameter, sharp in particle size distribution and mono-dispersed and which are usable particularly as spacer particles for display devices are obtained at low cost of production.

SUMMARY OF THE INVENTION

The invention provides an improvement in a process for preparing spherical particles of a metal oxide or hydroxide having a particle size of from 0.1 to 10 μm by adding a corresponding metal alkoxide to a dispersion of water-alcohol system having dispersed therein a metal oxide or hydroxide as a seed under alkaline conditions and allowing a hydrolyzed product from said metal alkoxide to attach onto said seed to effect particle growth of the seed, which improvement comprises maintaining said dispersion at a substantially constant pH within the range between 10 and 13 during the addition of the metal alkoxide to said dispersion and the subsequent particle growth of the seed, thereby to prepare mono-dispersed particles substantially free from particle aggregation having a sharp particle size distribution of a standard deviation of not greater than 0.5.

By the process according to the invention spherical particles of metal oxide or hydroxide which are large in particle size, sharp in particle size distribution and mono-dispersed that is substantially free from particle aggregation are obtained in a highly effective manner. In addition, the process according to the invention is advantageous in that the production cost of the desired particles can be reduced because the particle concentration in terms of an oxide concentration in the reaction system can be increased.

The particles prepared by the process according to the invention may be separated from the dispersion and subjected to heat treatment at a temperature of above 250° C. to provide black particles. When such black particles are used as spacers in display devices, sharp and clear images are obtained.

The particles prepared by the process according to the invention may be, optionally after the above-mentioned heat treatment, coated on the surface thereof with a synthetic resin. The resin coated particles are advantageous in that when they are used as spacers in display devices they do not move in the display devices.

DETAILED DESCRIPTION OF THE INVENTION

The process for preparing particles in accordance with the present invention will now be illustrated below in more detail.

In the present invention, a dispersion of water-alcohol system having dispersed therein a metal oxide or metal hydroxide as a seed is first prepared. The seeds to be dispersed in the dispersion of water-alcohol system are metal oxide or metal hydroxide particles, but other particles which are substantially uniform in particle diameter are also usable. The particles used as seeds are preferably those which have a particle diameter as uniform as possible, for example, ranging from about 0.05 to about 9 μm.

The dispersion of water-alcohol system having dispersed therein the seed may be prepared by adding the seed to a water-alcohol mixed solution or by forming the seed in a dispersion of water-alcohol system. Of the dispersions of water-alcohol system thus prepared. preferably used are those in which the seeds have been dispersed, said seeds forming by hydrolyzing a metal alkoxide in a water-alcohol mixed solution. The process for forming the seeds has been described, for example, in "Particles and Particle Metallurgy", 23, (4), 19–24 (1976) or Journal Colloid & Interface Sci., 26, 62–69 (1968).

The dispersion of water-alcohol system having dispersed therein a metal oxide or metal hydroxide as a seed are obtained in the manner described above, and in that case the dispersion is made stable by addition of alkali so that the seeds do not aggregate to unite in a body (hereinafter the thus stabilized dispersion called sometimes "heel sol"). If the dispersion is not stabilized by the addition of alkali, the seeds in the dispersion aggregate to precipitate in certain cases. When the seeds aggregate, the hydrolyzed product of metal alkoxide attaches to the joint portion of the aggregated particles (the neck portion) and therefore no particles having a uniform particle diameter can be obtained.

The alkali used for stabilizing the dispersions includes ammonia, aqueous ammonia, alkali metal hydroxides such as sodium hydroxide, quaternary ammonium salts, amines, etc., which may be used either singly or in combination.

The alcohol concentration in the dispersions of water-alcohol system having dispersed the seeds therein is preferably 35–97% by weight. The alcohol used in the dispersions include lower alcohols such as methanol, ethanol, n-propanol, isopropanol, n-butyl alcohol, isobutyl alcohol, etc. The mixed solvents of these lower alcohols are also usable.

Further, as the dispersions of water-alcohol system used in the present invention. There can also be used other organic solvents in addition to water and alcohol. Usable as such organic solvents are those which are well compatible with water and alcohol as well as with metal alkoxides.

A concentration of the seed in the dispersion of water-alcohol system is preferably 0.05–20.0% by weight in terms of an oxide concentration. The use of the seed concentration of less than 0.05% by weight is not preferable, because new seeds will sometimes occur in the subsequent step of attaching a hydrolyzed product of alkoxide to the seed originally present, with the result that the particle size distribution of the resulting particles becomes broad. On the one hand, the use of the seed concentration exceeding 20.0% by weight is also not preferable, because the particles tend to aggregate in the step of attaching the metal alkoxide hydrolyzed product to the seed.

Next, to the heel sol that is the stabilized dispersion of water-alcohol system having dispersed therein the seed, is added a metal alkoxide which is then hydrolized under alkaline conditions, and a hydrolyzed product from said metal alkoxide is allowed to attach on to said seed to effect particle growth of the seed. During the addition of the metal alkoxide and the subsequent particle growth of the seed, the pH of the dispersion should be controlled at a substantially constant value within the range between 10 and 13. By the term "substantially constant value" we mean that the pH of the dispersion should be maintained within the range between $x-0.2$ and $x+0.2$, where x is a value of from 10 to 13.

Usable as metal alkoxides are any of those that have heretofore been used in the preparation of spherical particles of metal oxide or hydroxide by hydrolysis of the corresponding metal alkaoxide. Usable alkoxides include those of Si, Ti, Zr, Sn, Al, Mg, Zn, Be, Sc, Y, Hf, V, Nb, Ta, Cr, W, Fe, Ni, Cu, B, Ga, In, Ge, Pb, P, As, Sb, Bi, Se, Te and Ce. The ester groups constituting the alkoxides are preferably those having 1–7 carbon atoms, desirably 1–4 carbon atoms. Such metal alkoxides may be used after dilution with a diluent such as alcohol, or in the form of stock solution thereof.

In adding the metal alkoxide to the dispersion, it is preferable that the metal alkoxide is added to the dispersion together with an amount of a water-alcohol mixed solution sufficient to maintain the alcohol concentration in the dispersion within the range between 35% and 97% by weight based on the weight on the dispersion. The metal alkoxide and the water-alcohol mixed solution are preferably gradually added to the heel sol.

When the metal alkoxide is added to the heel sol, the metal alkoxide begins to be hydrolyzed and deposited onto the seed. At that time the pH of the dispersion suddenly changes. We have found that during the addition of the metal alkoxide and the subsequent particle growth of the seed, the pH of the dispersion should be controlled at a substantially constant value within the range between 10 and 13, or otherwise the seed particles may aggregate or new seeds may occur, and in consequence, a particle size distribution of the eventual particles may become undesirably broad. Preferably, a dispersion of water-alcohol system having dispersed therein a metal oxide or hydroxide as a seed is stabilized by adding thereto an amount of alkali sufficient to adjust the pH of the dispersion at a pH (x) within the range between 10 and 13, and the pH of the dispersion is maintained within the range between $x-0.2$ and $x+0.2$ during the step of the addition of the metal alkoxide and the subsequent step of the particle growth. Control of the pH can be effected by adding to the dispersion a necessary amount of alkali, such as ammonia, aqueous ammonia, amines, alkali metal hydroxides and quaternary ammonium salts alone or in combination.

The temperature employed in hydrolyzing the metal alkoxide is not particularly limited, but when the temperature above the boiling point of water or alcohol is adopted, a pressure should preferably be applied to the heel sol so as to retain its liquid phase. In this case, however, the hydrolysis reaction of the metal alkoxide is preferably carried out at a temperature below the critical temperature of alcohol or the like in the reaction system to keep the composition in the liquid phase unchanged.

In the manner now described, the metal alkoxide hydrolyzed product is allowed to attach onto the seed, thereby growing the seed particles. In that case, a concentration of the grown particles in the reaction system is preferably 0.05–20.0% by weight, more preferably 0.05–15.0% by weight in terms of an oxide concentration. When the final particle concentration is less than 0.05% by weight, the productivity is low and large amounts of alcohol are needed, thus the use of such a low concentration is poor economy and, on the one hand, the use of such concentrations as exceeding 20% by weight is not preferable since the particles aggregate during growth and a particle size distribution of the particles obtained becomes broad.

In attaching the metal alkoxide decomposition product onto the seed, the alcohol concentration in the reaction system is preferably so adjusted to become 35–97% by weight. The use of the alcohol concentration of less than 35% by weight is not preferable as the compatibility of the alcohol with the metal alkoxide is poor and the emulsification thereof is brought about, with the result that the seed particles aggregate or the particles obtained are not spherical but in definite in shape. On the one hand, the use of the alcohol concentration exceeding 97% by weight is not preferable as the rate of hydrolysis of the metal alkoxide becomes excessively slow. The alcohol concentration in the reaction system can be controlled by the addition of the metal alkoxide, together with water and alcohol, to the reaction system. In this case, it is preferable that the alcohol is added in a proportion of 0.4–1.1 mol based on the metal alkoxide, and water is added in a proportion of 2.0–24.0 mol based on the metal alkoxide.

The particles dispersed in the dispersion of water-alcohol system obtained in the above manner are spherical with a particle diameter of about 0.1–10 μm, sharp in the particle size distribution thereof and mono-dispersed in the dispersion without causing aggregation. The particle concentration in terms of an oxide concentration can be 0.05–20.0% by weight, thus it is possible to markedly increase the particle concentration in the dispersion in comparison with the prior art process for preparing particles using metal alkoxides. Accordingly, in accordance with the present invention, not only the productive efficiency of the particles can be enhanced but also the reduction in cost of production can be schemed.

Furthermore, the particle concentration can be increased to about 60.0% by weight by concentration of the solids obtained after subjecting the dispersion obtained by the present invention, in which the metal oxide or metal hydroxide particles have been mono-dispersed, to solid-liquid separation. In that case, the liquid component obtained by the solid-liquid separation can be used again as the reaction liquid.

When the dispersion obtained according to the present invention is aged by the addition of stabilizers such as alkali in order to improve the stability of the particles mono-dispersed in said dispersion, the particles present in the dispersion thus aged do not aggregate or do not undergo any other changes over a long period of time. Furthermore, the alcohol in the dispersion may be substituted with other organic solvents.

The particles dispersed in the dispersion of water-alcohol system obtained in the manner as mentioned above are spherical with a particle diameter of about 0.1–10 μm. sharp in the particle size distribution thereof ($\pm 0 \leq 0.5$), and mono-dispersed in the dispersion. According to the process for preparing particles as mentioned above, it is possible to control the particle diameter of the resulting particles to any desired values falling within the range of from 0.1 to 10 μm.

Subsequently, when the dispersion obtained in the manner described hereinbefore is dried by the usual way to obtain spherical particles having good dispersibility, the particles obtained in this stage are still white. The dispersed white particles thus obtained are preferably usable as spacer particles for particularly display devices.

In accordance with the present invention, moreover, the water in the dispersion as mentioned above is substituted with an organic solvent, and the resulting organic solvent in which the particles have been dispersed can also be used as spacer in the liquid crystal layer without separating said particles therefrom.

The white particles obtained in the manner now described is subjected to heat treatment at a temperature above 250° C., preferably ranging from 250° to 1000° C. in air or in an atmosphere of inert gas, whereby said white particles change in color from white to black to give black particles. The reason why the black particles are obtained by heat treatment of the white particles at a temperature above 250° C. is considered ascribable to the following presumption. That is, organic matters such as unaltered metal alkoxide are present in the inside of particle prior to heat treatment, and such organic matters are heated to a temperature above 250° C. to be decomposed or carbonized, whereby the particle blackens.

The heat treatment temperature of the white particles is above 250° C., preferably ranging from 250° to 1000° C. as mentioned above. In that case, however, the use of the temperature below 250° C. is not preferable as a long period of time is required for blacking the white particles, though the white particles eventually blackens. On the one hand, the use of the temperature exceeding 1000° C. is also not preferably as the sintering occurs between the particles.

In general, the blackening takes place at a relatively low temperature range of from 250° to 1000° C. when the white particles are small in diameter, but the heat treatment of the white particles has to be carried out at higher temperature zones with increasing the particle diameter of the white particles to be treated.

In the present invention, furthermore, when the metal alkoxide is added to the dispersion of water-alcohol system having dispersed therein the seed, an organic substance capable of dissolving or dispersing in said dispersion is added, together with said metal alkoxide, to the dispersion, and this organic substance is allowed to attach, together with the metal alkoxide hydrolyzed product, onto the seed, and the particles obtained are subjected to heat treatment at a temperature above 250° C., whereby the black particles obtained are found to be further improved in black color tone. Alternatively, the white particles obtained by drying the dispersion containing the same may be immersed, prior to heat treatment thereof, in a solution of the organic substance to attach said organic substance onto said particles, and the particles thus treated may be subjected to heat treatment, whereby the black particles further improved in black color tone are obtained.

The black particles obtained in the manner as mentioned above usually has a Y value of less than 10% said value corresponding to brightness of color represented by tristimulus values X, Y, Z of color as measured in accordance with JIS Z 8701-82, thus the black particles are excellent in blackness. On that account, the black particles obtained by the present invention are used spacers for liquid crystal in addition to their applications to ceramic raw materials, fillers for resin, etc. Particularly, when the black particles of the present invention are used as spacers for liquid crystal, there is obtained such an excellent effect that the displayed images obtained are found sharp and clear.

The white or black insulant particles obtained in the manner as aforesaid may be coated on the surface thereof with a synthetic resin. For coating the surface of the insulant particles, there may be adopted any methods so long as they are capable of coating the insulant particles on the surface almost uniformly with synthetic resin powders without causing aggregation of the coated insulant particles. As an example of these adoptable methods, the following method may be mentioned.

When insulant particles are placed under a dry atmosphere, the particles are electrostatically charged. For instance, when a metal of the metal alkoxide used in the preparation of particles is silicon, titanium, zirconium or tin, the resulting particles are negatively charged, and when the metal used is aluminum, magnesium or zinc, the resulting particles are positively charged. On the particles thus charged are coated by adsorption spherical synthetic resin powders having the opposite charge.

In that case, however, the synthetic resin powders are held almost on the whole surface of the particles, but because of a weak electrostatic force of attraction, the synthetic resin powders are apt to fall off from the particles Then, either the view of increasing the bonding force therebetween, an impact force is applied to the particles having adsorbed thereon the synthetic resin powders so as to fuse parts of the synthetic resin powders by means of the heat generated at the time of application of the impact force, whereby the synthetic resin powders adhere to one another and, at the same time, they are fixed on the insulant particles. To apply the impact force to the insulant particles having adsorbed thereon the synthetic resin powders, it is sufficient that the particles are charged into such a grinder as a ball mill, and the grinder is allowed to operate.

When the particles thus coated on the surface thereof with a synthetic resin powders are used, for example, as spacer particles for display devices, the spacer particles are firmly fixed by means of the synthetic resin to electrode bases or the like of the display devices and consequently the spacer particles used do not move in the display devices.

Figure 2:
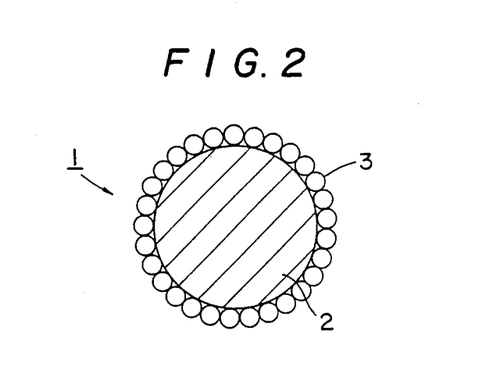
FIG. 2 is a cross-sectional view of the particle coated on the surface thereof with a synthetic resin.

As shown in its schematic drawing of FIG. 2, in each the particles 1 used as spacer particles for display devices, each of inorganic insulant particles 2 has been coated on the surface thereof with synthetic resin powders 3.

While this insulant particle 2 has been coated practically on the whole surface thereof with the synthetic resin powders 3, it is not always necessary that the particle is wholly coated on the surface thereof with said resin powders.

As shown in the schematic drawing of FIG. 2, the synthetic resin powders 3 may be in a state where they retain their spherical shape and are cemented to one another, or in certain case they may be in a state where parts of them are fused to form a thin film thereof.

When a diameter of the insulant particle 2 is taken as D, a diameter d of the synthetic resin powders 3 covering the insulant particle 2 is D/5 or less, preferably less than D/7, and more particularly the diameter of the synthetic resin powder is desirably 0.01–2.0 $\mu$m, preferably 0.01–1.0 $\mu$m. The use of synthetic resin powder having a diameter d exceeding D/5 is not preferable since the synthetic resin powder 3 sometimes falls off due to its own height from the surface of the insulant particle 2.

The diameter D of insulant particle corresponds to a diameter of spacer particle, and said diameter D is preferably 0.1–10 $\mu$m.

In preparing the synthetic resin powders 3, there are used thermoplastic resins having a glass transition point of below 200° C. or thermosetting resins having a curing temperature of below 200° C. The use of thermoplastic resins having a glass transition point above 200° C. or thermosetting resins having a curing temperature of above 200° C. is not preferable since elevated temperatures should be adopted when spacer particles are fixed in display devices.

Figure 3:
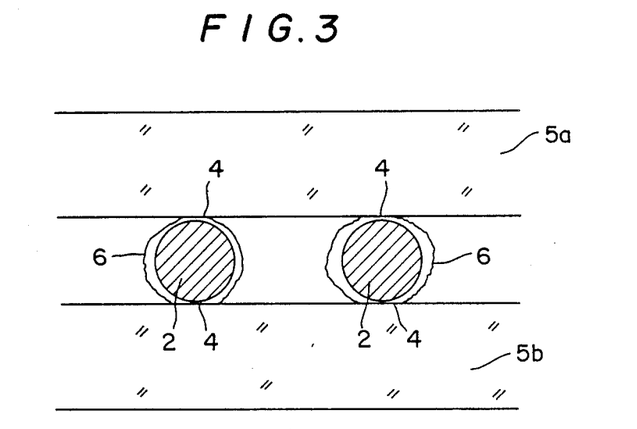
FIG. 3 is a schematic drawing showing a state of adhesion between a substrate and particles when the resin coated particles are used as spacer particles.

The particles thus obtained, when used as spacer particles for liquid crystal devices in the manner as will be mentioned later, are incorporated into thermosetting sealing resins and provided at the circumferential portions of the substrate of the display devices and, at the same time, are provided at the liquid crystal layer portions wherein no sealing resin is provided. In this case, the two substrates are bonded together by heating and at the time of heating, the synthetic resin powders 3 coated on the surface of the insulant particles 2 fuse and are fixed, as shown in FIG. 3, through thin synthetic resins layers 4, to a pair of substrates 5a and 5b for the display device. In this case, the insulant particles 2 are bonded by heating, and hence no surplus synthetic resin is present therebetween leaving the very thin synthetic resin films 4 therebetween. It is considered that the fused synthetic resin gather around the side portions 6 of insulant particles 2. In the present invention, accordingly the insulant particles 2 are almost equal in size to the spacer particles.

All particles prepared by the processes of the present invention as mentioned hereinbefore, when used as spacer particles for display devices, exhibit such excellent characteristics that they have a sharp particle size distribution, can controlled to have any desired particle size and can cope with delicate change in thickness because they do not aggregate, have a uniform thickness and are not visible by the naked eye through the outside.

Further, the particles prepared by the processes of the present invention do not damage transparent electrodes because they are spherical in shape, and also they do not change in shape by application of heat or pressure, and further they have such an effect that spacers high in purity are obtained therefrom since the particles of the present invention start from metal alkoxide.

Display devices in which the particles prepared by the processes of the present invention are preferably used include, in addition to liquid crystal display devices, electro chromic displays (ECD), plasma displays (PDP), liquid crystal printers, touch pannels, photomodulating elements, etc.

To assemble display devices such as liquid crystal devices using the dispersed particles obtained by the processes described hereinbefore, the methods, per se, known are applicable.

The present invention will be illustrated below with reference to examples, but it should be construed that the invention is in no way limited thereto.

EXAMPLE 1

A mixed solution of ethyl alcohol (486.50 g) and water (398.05 g) was kept with stirring at 35° C., and in this mixed solution was dissolved ammonia gas (71.72 g). The resulting mixture was charged with 28% ethyl silicate (ethanol solution of 28% by weight of ethyl silicate in terms of $SiO_2$) (17.39 g) and thereafter stirred for 2 hours to obtain a white turbid liquid (I) in which 0.5% by weight, in terms of $SiO_2$, of seed particles had been dispersed.

To this white turbid liquid (I) was immediately added an aqueous solution (3.3 g) in which NaOH (0.033 g) had been dissolved, and the mixture was subjected for 10 minutes to supersonic wave treatment to obtain a heel sol comprising a water-alcohol dispersion in which the seed particles had been dispersed.

The thus obtained heel sol (974 g) was kept with stirring at 35° C., while controlling the pH of the heel sol with ammonia was to 11.5, and thereto were added gradually and simultaneously in 19 hours a mixed solution of ethyl alcohol (1508.6 g) and water (3006.8 g), and 28% ethyl silicate (2268 g). After completion of the addition, to the resulting mixture was added an aqueous solution (204 g) in which NaOH (2.04 g) had been dissolved, and the mixture was heated at 70° C. and kept at that temperature for 2 hours.

Physical properties of the dispersion thus obtained are shown in Table 1.

Figure 1:
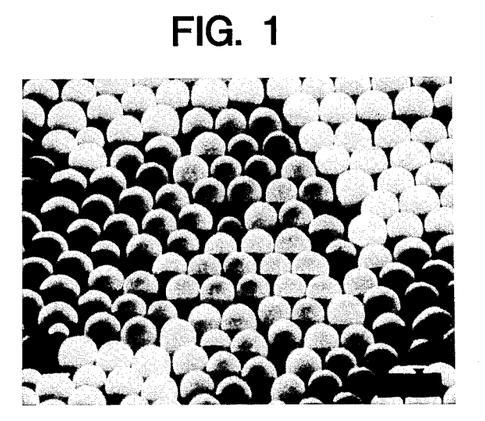
FIG. 1 is a scanning type electron microscopic photograph (magnification: 10,000) showing the shape of particle obtained in accordance with the present invention.

A shape of the particles obtained was examined by means of a scanning type electron microscope (SEM) to obtain a photograph (magnification: 10000) as shown in FIG. 1.

EXAMPLE 2

Example 1 was repeated except that the mixed solution of ethyl alcohol and water, and the 28% ethyl silicate were added in 2 hours to the heel sol.

Physical properties of the dispersion obtained are shown in Table 1.

EXAMPLE 3

Example 1 was repeated except that a mixed solution of ethyl alcohol (1507 g), water (2253 g) and 28% aqueous ammonia (1026 g), and 28% ethyl silicate (2268 g) were simultaneously added in 10 minutes to the heel sol in place of the addition of the mixed solution of ethyl alcohol and water, and the 28% ethyl silicate to the heel sol in 19 hours.

Physical properties of the dispersion obtained are shown in Table 1.

EXAMPLE 4

Example 1 was repeated except that ethyl alcohol (284 g), water (443 g) and 28% ethyl silicate (426 g) were added to the heel sol (184 g) while adjusting the heel sol to pH 12.0.

Physical properties of the dispersion obtained are shown in Table 1.

EXAMPLE 5

Example 4 was repeated except that the ethyl alcohol added was 112 g and the water added was 164 g, while the heel sol was adjusted to pH 11.0.

Physical properties of the dispersion obtained are shown in Table 1.

EXAMPLE 6

Example 1 was repeated except that there was used a seed dispersion (184 g) obtained by dispersing $SiO_2$ having an average particle size of 1 μm in a water-alcohol mixed solution (a weight ratio of 55/45 of ethyl alcohol/water) so that $SiO_2$ in the solution amounts to 0.5% by weight, and to this dispersion were added ethyl alcohol (266 g), water (521 g) and 28% ethyl silicate (467.4 g).

Physical properties of the dispersion obtained are shown in Table 1.

EXAMPLE 7

Example 1 was repeated except that there was used as a seed dispersion (184 g) obtained by dispersing $SiO_2$ having an average particle diameter of 8μm in a water-alcohol mixed solution (a weight ratio of 55/45 of ethyl alcohol/water) so that $SiO_2$ in the solution amounts to 0.5% by weight, and to this dispersion were added in 3 hours ethyl alcohol (7.1g), water (7.8 g) and 28% ethyl silicate (3.49 g).

Physical properties of the dispersion obtained are shown in Table 1.

EXAMPLE 8

To water (81.6 g) having dissolved therein NaOH (0.006 g) was added silica sol (2.3 g)(SI-80P, a product of CATALYSTS & CHEMICALS INDUSTRIES CO. LTD) and was further added ethyl alcohol (100.7 g), followed by stirring, and the mixed liquid obtained was kept at 35° C. To this dispersion were added in 19 hours gradually and simultaneously, while controlling the dispersion to pH 11.5 with ammonia gas, a mixed solution of ethyl alcohol (741g) and water (676 g), and 28% ethyl silicate (407.4 g). After completion of the addition, the dispersion was charged with an aqueous solution (37.0 g) having dissolved therein NaOH (0.37 g), heated at 70° C., and kept at that temperature for 2 hours.

Physical properties of the dispersion obtained are shown in Table 1.

EXAMPLE 9

A mixed solution of isopropyl alcohol (486.5 g) and water (398.05 g) was kept with stirring at 35° C., and in this mixed solution was dissolved ammonia gas (71.72 g). The mixed solution was charged with titanium tetrapropoxide (17.39 g), and stirred for 2 hours while adjusting the solution to pH of a level above 11, whereby a white turbid liquid (II) in which particles had been dispersed was obtained.

A seed dispersion was prepared by diluting the thus obtained white turbid liquid [II] with isopropyl alcohol so that the particles in the liquid amounts to 0.5% by weight in terms of $TiO_2$. To this seed dispersion (184 g) kept With stirring at 35° C. were added in 4 hours gradually and simultaneously, while controlling the dispersion to pH 11.5 with ammonia gas, a mixed solution of isopropyl alcohol (166.5 g) and water (311 g), and titanium tetrapropoxide (281.3 g). After completion of the addition, the dispersion was heated at 70° C. and kept at that temperature for 2 hours.

Physical properties of the dispersion obtained are shown in Table 1.

EXAMPLE 10

A mixed solution comprising a n-butyl alcohol/isopropyl alcohol (a weight ratio=1/1 [A] (486.5 g), and water (398.05 g) was kept with stirring at 35° C., and in this mixed solution was dissolved ammonia gas (71.72 g). The mixed solution was charged with zirconium tetrabutoxide (17.39 g) and stirred for 2 hours, while adjusting the liquid to pH of a level above 11. whereby a white turbid liquid [III] in which particles had been dispersed was obtained.

A seed dispersion was prepared by diluting the thus obtained white turbid liquid [III] with the above-mentioned mixture [A] so that the particles in the liquid amount to 0.5% by weight in terms of $ZrO_2$. The same procedure as in Example 1 was then followed except that to this seed dispersion (184 g) were added the above-mentioned mixed solution [A] (166.5 g) and zirconium tetrabutoxide (281.3 g).

Physical properties of the dispersion obtained are shoWn in Table 1.

COMPARATIVE EXAMPLE 1

Example 1 was repeated except that aqueous NaOH solution as alkali was not added to the white turbid liquid [I].

Physical properties of the dispersion obtained are shown in Table 1.

COMPARATIVE EXAMPLE 2

Example 4 was repeated except that the amount of ethyl alcohol added was 115 g, the amount of water added was 615 g, and no control of the pH with ammonia gas was effected at the time of addition of the 28% ethyl silicate to the heel sol.

Physical properties of the dispersion obtained are shown in Table 1.

COMPARATIVE EXAMPLE 3

Example 8 was repeated except that to water (81g) was added silica sol (2.3 g)(SI-80P, a product of CATALYSTS & CHEMICALS INDUSTRIES CO.,LTD) and was further added ethyl alcohol (100.7 g), followed by stirring, and the mixed liquid thus obtained was kept at 35° C. without addition thereto of alkali.

Physical properties of the dispersion obtained are shown in Table 1.

EXAMPLE 11

A mixed solution of ethyl alcohol (96.8 g) and water (0.186 g) was kept with stirring at 15° C., and in this mixed solution was dissolved ammonia gas (2.72 g). This mixed solution was charged with 28% ethyl silicate (0.375 g) and the stirred for 5 hours to obtain a white turbid liquid (IV) in which seed particles corresponding to 0.1% by weight in terms of $SiO_2$ had been dispersed. To this white turbid liquid (IV) was immediately added 0.06 g taken out of an aqueous solution (0.6 g) having dissolved therein NaOH (0.006 g). and the mixture was subjected for 10 minutes to supersonic have treatment to obtain a heel sol in which the seed particles had been dispersed in the water-alcohol dispersion. To the thus obtained heel sol (100 g) kept with stirring at 35° C., while controlling the heel sol to pH 11.5 with ammonia gas, were added in 19 hours gradually and simultaneously a mixed solution of ethyl alcohol (4558.7 g) and Water (47.2 g), and 28% ethyl silicate (16.5 g). After completion of the addition, the liquid was charged with an aqueous solution (3.0 g) having dissolved therein NaOH (0.03 g) and heated at 70° C. and kept at that temperature for 2 hours.

Physical properties of the dispersion obtained are shown in Table 1.

EXAMPLE 12

In a water-alcohol mixed solution (3238 g) with an ethyl alcohol/water weight ratio of 89/11 it was dissolved ammonia gas (90.8 g), and to this mixed solution Was added $SiO_2$ particles (138.7 g) having an average particle diameter of 3.5 μm, whereby a seed dispersion was obtained, in which the seed particles corresponding to 4% by weight in terms of $SiO_2$ in the mixed solution had been dispersed. To this seed dispersion was immediately added an aqueous solution (90 g) having dissolved therein NaOH (0.9 g), and the mixture was subjected for 10 minutes to supersonic wave treatment, whereby a heel sol comprising a water-alcohol dispersion having dispersed therein the seed particles. To the thus obtained heel sol kept with stirring at 35° C., while controlling the heel sol to pH 12.5 with ammonia gas, were added gradually in 5 hours a mixed solutIon of ethyl alcohol (1544.2 g) and water (263.5 g), and simultaneously with 28% ethyl sIlicate (557.4 g). After completion of the addition, the resulting liquid was charged with an aqueous solution (101 g) having dissolved therein NaOH (1.01 g), heated at 65° C. and kept at that temperature for 1 hour.

Physical properties of the dispersion obtained are shown in Table 1.

EXAMPLE 13

In a water-alcohol mixed solution (5714 g) with an ethyl alcohol/water weight ratio of 64.5/35.5 was dissolved ammonia gas (258 g), and to this mixed solution was added $SiO_2$ particles (248.8 g) having an average particle diameter of 5.0 μm to obtain a seed dispersion in which the seed particles corresponding to 4% by weight in terms of $SiO_2$ in the mixed solution had been dispersed. To this seed dispersion was immediately added an aqueous solution (161 g) having dissolved therein NaOH (1.61 g), and the resultant mixture was subjected for 10 minutes to supersonic wave treatment to obtain a heel sol in which the seed particles had been dispersed in a water-alcohol dispersion. The thus obtained heel sol was charged with stirring into an autoclave, a pressure of 7.5 kg/cm² was applied thereto with nitrogen gas, and the heel sol was then kept at 120° C. To the heel sol thus kept were added gradually in 5 hours a mixed solution of ethyl alcohol (305.1 g) and water (764.7 g) dissolved ammonia gas (68.3 g) simultaneously with 28% ethyl silicate (647 g). After completion of the addition, the resulting heel sol was charged with an aqueous solution (117 g) having dissolved therein NaOH (1.17 g), heat at 150° C., and kept at that temperature for 1 hour.

Physical properties of the dispersion obtained are shown in Table 1.

An average particle diameter ($D_p$) of spherical particles present in the dispersions obtained in the foregoing examples and comparative examples was measured by means of an optical transmission type particle size measuring instrument (manufactured and sold by Horiba Seisakusho K.K.), and a particle diameter and a state aggregation of said particles were examined by means of a scanning type electron microscope (SEM). Furthermore, uniformity of particle size distribution was represented by a coefficient of uniformity ($C_v$) indicated by the following equation.

$$\text{Coefficient of uniformity } (C_v) = \frac{D_2 - D_1}{2D_p}$$

$D_1$: Particle diameter of the particles when the cumulative total of the particles was 16% by weight.

$D_2$: Particle diameter of the particles when the cumulative total of the particles was 84% by weight.

$D_p$: Average particle cumulative.

TABLE 1

| | $D_p$ | | Coefficient of uniformity $C_v$ | State of Aggregation |
|---|---|---|---|---|
| | *1 SEM (μm) | *2 CaPa (μm) | | |
| Example | | | | |
| 1 | 0.9 | 1.0 | 0.10 | o |
| 2 | 0.9 | 0.9 | 0.10 | o |
| 3 | 1.4 | 1.5 | 0.19 | o |
| 4 | 1.2 | 1.2 | 0.11 | o |
| 5 | 1.1 | 1.1 | 0.20 | o |
| 6 | 5.0 | 5.0 | 0.15 | o |
| 7 | 9.9 | 10.0 | 0.19 | o |
| 8 | 0.3 | 0.35 | 0.15 | o |
| 9 | 1.1 | 1.1 | 0.18 | o |
| 10 | 1.0 | 1.0 | 0.10 | o |
| 11 | 1.5 | 1.5 | 0.02 | o |
| 12 | 4.5 | 4.6 | 0.08 | o |
| 13 | 6.0 | 6.1 | 0.12 | o |
| Comparative Example | | | | |
| 1 | 1.0 | 2.8 | — | x |

TABLE 1-continued

| | $D_p$ | | Coefficient of uniformity $C_v$ | State of Aggregation |
|---|---|---|---|---|
| | *1 SEM (μm) | *2 CaPa (μm) | | |
| 2 | 1.2 | 1.9 | — | x |
| 3 | 0.3 | 0.8 | — | x | o: No state of aggregation is observed.
x: Aggregation is observed.
*1: Value as measured by means of SEM.
*2: Value as measured by means of the optical transmission Type particle size measuring instrument.

The fact that no substantial difference is observed between particle sizes as measured by SEM and the optical transmission type particle size measuring instrument means that the particles obtained are monodispersed.

Accordingly, it is understood from Table 1 that the particles obtained in the present invention are monodispersed and moreover a coefficient of uniformity $C_v$ thereof is small, and also from FIG. 1 that the present particles having excellent uniformity.

EXAMPLE 14

In a mixed solution of ethyl alcohol (487 g) and water (389 g) kept with stirring at 35° C. was dissolved ammonia gas (71.7 g). This solution was charged with 28% ethyl silicate (17.4 g) and then stirred for 2 hours to obtain a white turbid liquid in which seed particles corresponding to 0.5% by weight in terms of $SiO_2$ had been dispersed.

To this white turbid liquid was immediately added an aqueous solution (3.3 g) having dissolved therein NaOH (0.03 g), whereby a heel sol (A) comprising the seed particles dispersed in a water-alcohol dispersion was obtained.

To 97 g out of the thus obtained heel sol (A) kept with stirring at 35° C., while controlling the heel sol (A) to pH11.5 with ammonia gas, were added gradually in 19 hours a mixed solution of ethyl alcohol (455 g) and Water (886 g) simultaneously With 28% ethyl silicate (570 g). After completion of the addition, the heel sol was charged with an aqueous solution (103 g) dissolved therein NaOH (1.0 g), heated at 70° C., and kept at that temperature for 2 hours, whereby a dispersion (I) was obtained. This dispersion (I) was dried at 200° C. to obtain powder particles.

The thus obtained powder particles (1 g) were dispersed in a sealing resin (100 g) (an epoxy resin, produced and sold by Mitsui Toatsu Chemicals, Inc.) to prepare an ink composition. Substrates for large liquid crystal display devices were obtained by printing the thus obtained ink composition on the circumference of an orientation membrane of a laminate comprising a glass plate on which transparent electrodes and orientation membrane had been formed.

Subsequently, in 1 liter of ethyl alcohol (EtOH) was dispersed the powder particles (0.01 g) obtained in the manner as above, and the dispersion thus obtained was sprayed over portions of the substrate for large crystal display devices placed in a spraying chamber kept at 60° C. and 3 % humidity, said portions being not provided with the sealing resin. The substrate was then subjected to predrying at 90° C. for 30 minutes, and then placed upon the surface of another substrate for large liquid crystal display devices comprising a glass plate on which transparent electrodes and orientation membrane had been formed. The substrate thus assembled was heated for 1 hour at 150° C. under a pressure of 3 kg/cm² to cure the resin, whereby 100 pieces of cells for large liquid crystal display devices were prepared.

Into the portion of the thus obtained cells for large liquid crystal display devices, said portion not being provided with the sealing resin, was injected such liquid crystal as will be mentioned later, whereby a large liquid crystal display device was obtained.

EXAMPLE 15

To the dispersion (I) (114 g) kept with stirring at 35° C. were added ethyl alcohol (63 g) and water (51 g). To the resulting mixture, while controlling the mixture to pH 11.5 with ammonia gas, were added gradually in 19 hours a mixed solution of ethyl alcohol (638 g) and water (814 g) simultaneously with 28% ethyl silicate (325 g). After completion of the addition, the resulting liquid was charged with an aqueous solution (65 g) having dissolved therein NaOH (0.7 g), heated at 70° C., and kept at that temperature for 2 hours to obtain a heel sol (B). To this heel sol (B) (94.6 g) kept with stirring at 65° C. were added ethyl alcohol (116 g) and water (95 g). To the resulting mixture. While controlling the mixture to pH11.5 with ammonia gas, were gradually added in 19 hours a mixed solution of ethyl alcohol (307 g) and water (438 g) simultaneously with 28% ethyl silicate (207 g). After completion of the addition, the resulting mixture was charged with an aqueous solution (65 g) having dissolved therein NaOH (0.7 g), heated at 70° C., and kept at that temperature for 2 hours to obtain a dispersion (II). This dispersion (II) was dried at 200° C. to obtain powder particles.

A large liquid crystal display device was then prepared according to the same procedure as in Example 14 except that the thus obtained powder particles (1.5 g) was dispersed in the sealing resin (100 g) to prepare an ink composition and the powder particles (0.05 g) was dispersed in 1 liter of ethyl alcohol to prepare a dispersion.

EXAMPLE 16

To the dispersion (II) (1126 g) obtained in Example 15 kept with stirring at 65° C. were added ethyl alcohol (155 g) and water (127 g). To &he resulting mixture, while controlling the mixture to pH 11.5 with ammonia gas, were added gradually in 19 hours a mixed solution of ethyl alcohol (164 g) and water (275 g) simultaneously with 28% ethyl silicate (156 g). After completion of the addition, the resulting mixture was charged with an aqueous solution (65 g) having dissolved therein NaOH (0.7 g), heated at 48° C., and kept at that temperature for 2 hours at obtain a heel sol (C).

To this heel sol (C) (1324 g) kept with stirring at 65° C. were added ethyl alcohol (185 g) and water (151 g). To the resulting mixture, while controlling the mixture to pH 11.5 with ammonia gas, were added gradually in 19 hours a mixed solution of ethyl alcohol (93 g) and water (150 g) simultaneously with 28% ethyl silicate (82 g). After completion of the addition, the resulting mixture was charged with an aqueous solution (58 g) having dissolved therein NaOH (0.6 g), heated at 48° C., and kept at that temperature for 2 hours to obtain a dispersion (III) was dried at 200° C. to obtain powder particles.

A large liquid crystal display device was then prepared according to the same procedure as in Example 14 except that the thus obtained powder particles (1.8 g)

was dispersed in the sealing resin (100 g) to prepared an ink composition and the powder particle (0.1 g) was dispersed in 1 liter of ethyl alcohol to prepare a dispersion.

EXAMPLE 17

To the heel sol (A) obtained in Example 14 kept with stirring at 35° C., while controlling the heel sol to pH 11.5 with ammonia gas, were gradually added in 19 hours a mixed solution of ethyl alcohol (1509 g) and water (3007 g) simultaneously with 28% ethyl silicate (2268 g). After completion of the addition, the resulting mixture was charged with an aqueous solution (204 g) having dissolved therein NaOH (2 g), heated at 48° C., and kept at that temperature for 2 hours to obtain a dispersion (IV). This dispersion (IV) was dried at 200° C. to obtain powder particles.

A large liquid crystal display device was then prepared according to the same procedure as in Example 14 except that the thus obtained powder particles (0.5 g) was dispersed in the sealing resin (100 g) to prepare an ink composition and the powder particles (0.1 g) was dispersed in 1 liter of ethyl alcohol to prepare a dispersion.

that such conventionally known spacers as indicated in Table 2 were also used in some cases.

Characteristics of large liquid crystal display devices as prepared were evaluated according to the following method.

(1) The cell was cut off with a diamond cutter at its center portion, right side portion and left side portion, and a thickness of liquid crystal layer at each portion was measured by means of an electron microscope.

(2) The presence in the image portions of coarse spacer particle (aggregated particle) was examined by the naked eye, and when even one coarse spacer particle was observed in the images displayed in the device, said device was graded a defective device.

In Example 14 and 17, and Comparative Examples 4 and 7, Smc* liquid crystal (a strongly dielectric liquid crystal, a product of Merck) was used, in Examples 15 and Comparative Examples 5 and 8, SBE liquid crystal (a product of Merck) was used, in Examples 16 and Comparative Examples 6 and 9, TN liquid crystal (a product of Merck) was used. The large liquid crystal display devices as prepared were examined with respect to their performance to obtain the results as shown in Table 3.

TABLE 2

| Item | Shape of spacer Diameter [μm] | Shape of spacer Irregularity $\sigma$ [μm] | Weight of spacer particles per 100 g of the resin in the ink composition [g] | Weight of spacer particles per liter of ethanol in the dispersion [g] | Remarks |
|---|---|---|---|---|---|
| Example | | | | | |
| 14 | 2.03 | 0.02 | 1.0 | 0.01 | Spherical |
| 15 | 6.02 | 0.09 | 1.5 | 0.05 | |
| 16 | 8.04 | 0.14 | 1.8 | 0.10 | |
| 17 | 1.01 | 0.02 | 0.5 | 0.01 | |
| Comparative Example | | | | | |
| 4 | 2.20 | 0.39 | 2.2 | 0.02 | Hexagomallu columnar |
| 5 | 6.66 | 1.25 | 3.0 | 0.10 | Alfit (a trade name) |
| 6 | 8.05 | 1.90 | 3.6 | 0.20 | a product of Showa Denko K.K. |
| Comparative Example | | | | | |
| 7 | 2.20 | 0.17 | 0.9 | 0.01 | Spherical Epostar |
| 8 | 5.67 | 0.33 | 1.0 | 0.04 | (a trade name) |
| 9 | 7.94 | 0.25 | 1.2 | 0.08 | a product of Nippon Shokubai Kasei Kogyo K.K. |

$\sigma$: Population standard deviation of d
Number of samples = 100

COMPARATIVE EXAMPLES 4–9

Large liquid crystal display devices were prepared according to the same procedure as Example 14 except

TABLE 3

| Item | Thickness of liquid crystal layer [μm] | Irregularity in thickness of liquid crystal layer $\sigma$ [μm] | Percent defective Coarse Particle | Percent defective Poor Performance |
|---|---|---|---|---|
| Example | | | | |
| 14 | 2.08 | 0.06 | 0/100 | 0/100 |
| 15 | 6.40 | 0.16 | 0/100 | 0/100 |
| 16 | 8.90 | 0.20 | 0/100 | 0/100 |
| 17 | 1.05 | 0.05 | 0/100 | 0/100 |
| Comparative Example | | | | |
| 4 | 2.50 | 0.40 | 0/100 | 8/100 |
| 5 | 7.91 | 1.31 | 0/100 | 6/100 |
| 6 | 9.62 | 1.95 | 0/100 | 3/100 |
| 7 | 2.30 | 0.15 | 50/100 | 0/100 |

TABLE 3-continued

| Item | Thickness of liquid crystal layer [μm] | Irregularity in thickness of liquid crystal layer σ [μm] | Percent defective | |
|---|---|---|---|---|
| | | | Coarse Particle | Poor Performance |
| 8 | 5.90 | 0.35 | 10/100 | 1/100 |
| 9 | 8.50 | 0.28 | 10/100 | 0/100 |

σ: Population standard deviation of thickness
Number of samples = 300

EXAMPLE 18

The dispersion (I) obtained in Example 14 was dried at 110° C. to obtain white powder particles.

Subsequently, the thus obtained white powder particles were subjected in an air atmosphere to heat treatment at 350° C. for 3 hours, whereupon black particles were obtained.

A large liquid crystal display device was then prepared according to the same procedure as in Example 14 except that the thus obtained black powder particles (1 g) was dispersed in the sealing resin (100g) to prepare an ink composition and the poWder particles (0.01g) was dispersed in 1 liter of ethyl alcohol to prepare dispersion.

EXAMPLE 19

The dispersion (II) obtained in Example 15 was dried at 110° C. to obtain white powder particles.

Subsequently, the thus obtained white powder particles were subjected in a nitrogen atmosphere to heat treatment at 750° C. for 3 hours, whereupon black particles were obtained.

A large liquid crystal display device was prepared according to the same procedure as in Example 18 except that the black particles (1.5 g) obtained above were dispersed in the sealing resin (100 g) to prepare an ink composition and the black particles (0.05 g) were dispersed in 1 liter of ethyl alcohol to prepare a dispersion.

EXAMPLE 20

The dispersion (III) obtained in Example 16 was dried at 110° C. to obtain white powder particles.

Subsequently, the thus obtained white powder particles were subjected in an air atmosphere to heat treatment at 750° C. for 3 hours to obtain black particles.

A large liquid crustal display device was then prepared according to &he same procedure as in Example 18 except that the black particles (1.8 g) obtained above were dispersed in the sealing resin (100 g) to prepare an ink composition and the black particles (0.1 g) were dispersed in 1 liter of ethyl alcohol to prepare a dispersion.

EXAMPLE 21

The dispersion (Iv) was then prepared according to the same procedure as in Example 17 except that the heel sol [A] obtained in Example 14 were added a mixed solution of ethyl alcohol (1509 g) and water (3007 g) in which a watersoluble phenol resin (9.5 g) (a product of Dainippon Ink and Chemicals, Inc.) had been dissolved.

This dispersion (Iv) was dried at 110° C. to obtain white powder particles.

Subsequently, the thus obtained white powder particles were subjected in a nitrogen atmosphere to heat treatment at 300° C. for 1 hour to obtain black particles.

A large liquid crystal display device was then prepared according to the same procedure as in Example 18 except that the black particles (0.5 g) obtained above were dispersed in the sealing resin (100 g) to prepare an ink composition and the black particles (0.1 g) were dispersed in 1 liter of ethyl alcohol to prepare a dispersion.

COMPARATIVE EXAMPLE 10-15

Large liquid crystal display devices were prepared according to the same procedure as in Example 18 except that such conventionally know spacers as indicated in Table 4 were also used in some cases.

Characteristics of large liquid crystal display devices as prepared were evaluated according to the same method as described in Comparative Examples 1-17.

In Example 18 and 21, Comparative Example 10 and 14, Smc* liquid crystal (a strongly dielectric liquid crystal, a product of Merk) was used, in Example 19, Comparative Examples 11 and 15, SBE liquid crystal (a product of Merk) was used, and in Example 20, Comparative Example 12 and 13, TN liquid crystal (a product of Merk) was used. The large liquid crystal display devices as prepared were examined with respect to their performance to obtain the results as shown in Table 5.

Y value (a value represented on the basis of JIS Z 8701) of black and white particles obtained in the foregoing examples and comparative examples was measured in the following manner.

Each of the black and white particles was placed in a cylindrical cell and measured in Y value with S & M color computer (SM4-CH Model, manufactured and sold by Suga Shikenki K.K.).

It is understood from Table 4 that the black particles obtained in the present invention have a particle diameter of 0.1–10 μm, a sharp particle size distribution and, moreover, they are black in color.

Furthermore, it is understood from Table 5 that when the black particles obtained in the present invention are used as liquid crystal spacers, the liquid crystal layers comprising the same are found less in irregularity in thickness and excellent in operating efficiency and, moreover, also excellent in display performance.

TABLE 4

| Item | Shape of particle | | Y value % | Weight of space particles per 100 g of the resin in the ink Composition [g] | Weight of spacfer particle per liter of ethanol in the dispersion [g] | Remarks |
| --- | --- | --- | --- | --- | --- | --- |
| | Diameter [μm] | Irregularity σ [μm] | | | | |
| Example | | | | | | |
| 18 | 2.03 | 0.02 | 7.0 | 1.0 | 0.01 | Spherical |
| 19 | 6.02 | 0.09 | 2.9 | 1.5 | 0.05 | |
| 20 | 8.04 | 0.14 | 1.5 | 1.8 | 0.10 | |
| 21 | 1.01 | 0.02 | 0.5 | 0.5 | 0.01 | |
| Comparative Example | | | | | | |
| 10 | 2.20 | 0.39 | 91.1 | 2.2 | 0.02 | Hexagonally columner |
| 11 | 6.66 | 1.25 | 93.7 | 3.0 | 0.10 | Alfit (a trade name) |
| 12 | 8.05 | 1.90 | 93.5 | 3.6 | 0.20 | a product of Showa Denko K.K. |
| Comparative Example | | | | | | |
| 13 | 2.20 | 0.17 | 93.0 | 0.9 | 0.01 | Spherical Epostar (a |
| 14 | 5.67 | 0.33 | 94.2 | 1.0 | 0.04 | trade name) a product |
| 15 | 7.94 | 0.25 | 93.8 | 1.2 | 0.08 | of Nippon Shokubai Kagaku Kogyo K.K. |

σ: Population standard deviation of d
Number of samples = 100

TABLE 5

| Item | Thickness of liquid crystal layer [μm] | Irregularity in thickness of crystal layer σ [μm] | Percent defective | | Contrast of display efficiency |
| --- | --- | --- | --- | --- | --- |
| | | | Coarse particle | Poor performance | |
| Example | | | | | |
| 18 | 2.08 | 0.06 | 0/100 | 0/100 | Good |
| 19 | 6.40 | 0.16 | 0/100 | 0/100 | Good |
| 20 | 8.90 | 0.20 | 0/100 | 0/100 | Good |
| 21 | 1.05 | 0.05 | 0/100 | 0/100 | Good |
| Comparative Example | | | | | |
| 10 | 2.50 | 0.40 | 0/100 | 8/100 | Decreased |
| 11 | 7.91 | 1.31 | 0/100 | 6/100 | Decreased |
| 12 | 9.62 | 1.95 | 0/100 | 3/100 | Decreased |
| 13 | 2.30 | 0.15 | 50/100 | 0/100 | Decreased |
| 14 | 5.90 | 0.35 | 10/100 | 1/100 | Decreased |
| 15 | 8.50 | 0.28 | 10/100 | 0/100 | Decreased |

σ: Population standard deviation of thickness
Number of samples = 100

EXAMPLE 22

The dispersion (III) obtained in Example 16 was dried at 110° C., and powder particles (1) were separated. The thus obtained powder particles (95 g) and methyl methacrylate resin powder (5 g) (a trade name MP-1000. particle diameter 0.4 μm, a product of Soken Kagaku K.K.) were mixed together to adsorb &he resin on the particles. Further, the particles were stirred by means of a ball mill to coat the resin on the particles (powder particles (2)).

A large liquid crystal display device was then prepared according to the same procedure as in Example 14 except that the thus obtained powder particles (1) (1 g) was dispersed in the sealing resin (100 g) to prepare an ink composition and the powder particles (2) (0.01 g) was dispersed in 1 liter of ethyl alcohol to prepare a dispersion and the substrate assembled was heated at 180° C.

EXAMPLE 23

A cell for large liquid crystal display devices was obtained in the same procedure as in Example 22 except that the powder particle (1) obtained in Example 22 was subjected in a nitrogen atmosphere to heat treatment at 750° C. for 3 hours to obtain black powder particles (3) and the thus obtained black powder particles (3) were used.

The spacer particles obtained in the present examples were determined in shape and population standard deviation thereof.

Further, the cells for liquid crystal display devices (LCD) were evaluated in the following method.
(1) The cell was cut off with a diamond cutter at its center portion, right side portion and left side portion, and cell gap was measured by means of an electron microscope.
(2) The presence in the image portions of coarse spacer particles (aggregated particles) was examined by the naked eye, and when even one coarse spacer particle was observed in the device, said device was graded a defective device.
(3) Display performance of LCD was confirmed when the LCD was obtained by assembling polarized light films so that transparent light is obtained when TN liquid crystal (a product of Merk) was injected and electric field was applied. Further, LCD cell was subjected to centrifuging with a centrifugal separator at 800G for 1 hour so that the spacer particles were rendered movable in the liquid crystal layer, and thereafter the LCD was confirmed with respect to its display performance.

(4) Large liquid crystal display devices were subjected to heat cycle test wherein heating and cooling cycle was repeated 4 times between −20° C. and 80° C., and display performance of the devices was confirmed.

The results obtained are shown in Table 6.

TABLE 6

| Item Example | Shape of spacer particle | | Cell gap | | percent defective | | | |
|---|---|---|---|---|---|---|---|---|
| | d [μm] | $\sigma_1$ [μm] | [μm] | $\sigma_2$ [μm] | Coarse particle | Poor performance | Poor performance after centrifuging | Heat cycle |
| 1 | 8.06 | 0.18 | 8.95 | 0.23 | 0/100 | 0/100 | 0/100 | 0/100 |
| 2 | 8.04 | 0.14 | 8.90 | 0.20 | 0/100 | 0/100 | 0/100 | 0/100 |

$\sigma_1$: Population standard deviation of d
Number of samples = 100
$\sigma_2$: Population standard deviation of cell gap
Number of samples = 100

What is claimed is:

1. A process for preparing particles used as spacers for a display device, which comprises hydrolyzing a metal alkoxide by adding said metal alkoxide to a dispersion of a water-alcohol system having dispersed therein a metal oxide or metal hydroxide as a seed, while maintaining said dispersion under alkaline conditions, allowing a decomposition product of said metal alkoxide to attach onto said seed, thereby effecting particle growth of the seed, and subsequently coating particles, separated from the dispersion, on the surface thereof with a synthetic resin.

2. The process as claimed in claim 1 wherein the alcohol concentration in the dispersion of the water-alcohol system having the seed dispersed therein is 35-97% by weight.

3. The process as claimed in claim 1, wherein the alcohol is methanol, ethanol, n-propanol isopropanol, n-butyl alcohol or isobutyl alcohol.

4. The process as claimed in claim 1 wherein the concentration of the seed in the dispersion of water-alcohol system is 0.05-20.0% by weight in terms of an oxide concentration.

5. The process as claimed in claim 1 wherein the metal alkoxide is added to the dispersion of water-alcohol system having dispersed therein the seed, while maintaining said dispersion at a pH 10-13.

6. A process for preparing particles used as spacers for a display device, which comprises hydrolyzing a metal alkoxide by adding said metal alkoxide to a dispersion of a water-alcohol system having dispersed therein a metal oxide or metal hydroxide as a seed, while maintaining said dispersion under alkaline conditions, allowing a decomposition product of said metal alkoxide to attach onto said seed, thereby effecting particle growth of the seed, and subsequently subjecting black particles, obtained by subjecting the particles separated from the dispersion, to heat treatment at a temperature above 250° C. and coating the surface thereof with a synthetic resin.

7. The process as claimed in claim 6, wherein the alcohol concentration in the dispersion of water-alcohol system having the seed dispersed therein is 35-95% by weight.

8. The process as claimed in claim 6 wherein the alcohol is methanol, ethanol, n-propanol, isopropanol, n-butyl alcohol or isobutyl alcohol.

9. The process as claimed in claim 6 wherein the concentration of the seed in the dispersion of water-alcohol system is 0.05-20.0% by weight in terms of an oxide concentration.

10. The process as claimed in claim 6 wherein the metal alkoxide is added to the dispersion of water-alcohol system having the seed dispersed therein, while maintaining said dispersion at a pH of 10-13.

* * * * *